United States Patent [19]

Sonneveld

[11] Patent Number: 4,948,682
[45] Date of Patent: Aug. 14, 1990

[54] ELECTRODE MATERIAL FOR USE IN A STORAGE BATTERY

[75] Inventor: Pieter J. Sonneveld, Helmond, Netherlands

[73] Assignee: Stork Screens, B.V., Netherlands

[21] Appl. No.: 314,989

[22] Filed: Feb. 24, 1989

[30] Foreign Application Priority Data

Feb. 26, 1988 [NL] Netherlands ............... 8800500

[51] Int. Cl.$^5$ .................................. H07M 2/38
[52] U.S. Cl. ............................ 429/67; 429/241
[58] Field of Search ............ 429/67, 241; 428/472

[56] References Cited

U.S. PATENT DOCUMENTS 4,166,885  9/1979  Durand ..................... 429/17 X

FOREIGN PATENT DOCUMENTS 0194950  9/1986  European Pat. Off. .

OTHER PUBLICATIONS

Cline et al., *Chemical Abstracts*, vol. 82, No. 174581, 1975.
Cline et al., *Chemical Abstracts*, vol. 80, No. 6441, 1974.

*Primary Examiner*—Stephen J. Kalafut
*Attorney, Agent, or Firm*—Hurt, Richardson, Garner, Todd & Cadenhead

[57] ABSTRACT

Electrode material for use in a storage battery half-cell containing a suspension, storage battery half-cell having an electrode of such material and a storage battery comprising such a storage battery half-cell.

Described is an electrode material for use in a storage battery half-cell of the type in which a suspension of particles of active material circulates. Upon charging such a half cell the electrode material according to the invention prevents the formation of a strongly adhering precipitate of active material, such as zinc, on the electrode material. The electrode material comprises for that purpose, at least at its surface, an electrically conducting ceramic material. The invention also concerns a storage battery half-cell comprising such electrode material and a storage battery comprising one or more storage cells each comprising two of such half cells.

4 Claims, 3 Drawing Sheets

ELECTRODE MATERIAL FOR USE IN A STORAGE BATTERY

Electrode material for use in a storage battery half-cell containing a suspension, storage battery half-cell having an electrode of such material and a storage battery comprising such a storage battery half-cell.

BACKGROUND OF THE INVENTION

The invention relates to an electrode material for use in a storage battery half-cell in which a suspension of particles of an active material is able to circulate. Such an electrode material or current collector is generally known and is described, for example, in the Dutch Application 7800921. In the description and claims which follow below, electrode and current collector are understood to mean the same, i.e. an electrically conducting material which does not itself participate actively in the electrochemical reactions which occur in the half-cell in which the material concerned is placed. In said publication, a zinc/air storage battery is described in which the zinc half-cell contains, as electrolyte, a circulating suspension of zinc particles in an alkaline liquid and in which the use of a metal anode collector with a passivating layer is described. This said zinc suspension-/air system is composed in general of a separate charging and discharging cell. For this purpose, the Zn suspension can be pumped from one cell to the other cell. During the discharging of a previously charged-up zinc/air storage battery, zinc in the zinc suspension half-cell is converted into zincate in accordance with the following equation:

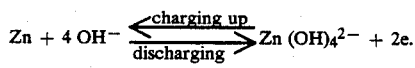

$$Zn + 4 OH^- \underset{discharging}{\overset{charging\ up}{\rightleftarrows}} Zn(OH)_4{}^{2-} + 2e.$$

The zincate ions formed during the discharging are converted into zinc particles again during the charging-up operation. During charging-up in the charging cell, zinc will settle in the form of a particulate precipitate on the current collector used and as a rule adhere thereto, unless the metals mentioned in the Dutch Application 7800921 are used in a passivated state. It is the intention that the precipitated zinc is again present in suspension form when the storage battery is being operated and therefore easily breaks loose of the current collector.

In the case of materials normally used, such as, for example, nickel, such adhesion easily occurs and the resuspension of the zinc precipitate is considerably hampered.

The use of current collector materials such as Mg and certain of the groups 3b, 4b, 5b and 6b of the periodic system of elements, however, sometimes gives rise to problems if the hydroxide layer becomes too thick and therefore exhibits too great an electrical resistance, as described in the patent application previously mentioned.

SUMMARY OF THE INVENTION

It has now been found that a solution can be provided for said adhesion problem and too high a resistance of the current collector by coating, according to the invention, the electrode material, at least at its surface which comes into contact with the suspension of active material, with a layer of electrically conducting ceramic material chosen from metal nitrides, metal carbides, metal borides, metal silicides, metal beryllides, metal selenides, metal phosphides or metal chromides and combinations thereof such as beryl borides. Particularly usable are the ceramic conducting materials which develop a high overvoltage with respect to hydrogen, such as vanadium nitride (VN), niobium carbide or niobium nitride (NbC, NbN), and titanium borides, titanium nitrides, titanium carbides and titanium silicides ($TiB_2$, TiN, TiC, $Ti_5Si_3$, $TiSi_2$) and also such magnesium compounds such as MgN, MgC and $Mg_2Si$. Using such a coating of one of said conducting ceramic compounds achieves the result that adhesion of a precipitate, for example a zinc precipitate, to the electrode surface is very low and that even with low turbulence of the electrolyte liquid, the precipitate formed comes loose and is resuspended. The construction of an electrode composed entirely of ceramic material is also included in the possibilities. As a result of these constructions, one and the same cell can be used both for the charging and the discharging process; i.e. is then usable as a secondary cell.

Advantageously, the electrode or current collector used in a storage battery half-cell is a porous electrode through which the suspension of active material to be used flows. If use is made of an electrically conducting material which is coated with a layer of one of the said electrically conducting ceramic materials, a layer thickness between 0.1 and 5.0 micrometers will in general be adequate. Using such an electrode material coated with ceramic material also makes possible the use of a cell as secondary cell as specified previously. The application of a such layer can be carried out in many ways; consideration can be given in this connection to chemical vapour deposition (CVD), physical vapour deposition (PVD), cathode sputtering methods, plasma jet spraying methods and the like, which are known per se. The invention also relates to a storage battery half-cell in which a suspension of particles of an active material is able to circulate, comprising a casing, electrolyte circulation means, an electrode and electrode attachment means, characterized in that the electrode or current collector is formed from a material which is coated, at least at its surface which comes into contact with the suspension to be used, with an electrically conducting ceramic material such as metal nitrides, metal carbides, metal borides, metal silicides, metal beryllides, metal selenides, metal phosphides or metal chromides and combinations thereof such as beryl borides, and also the abovementioned conducting ceramic materials which exhibit a high $H_2$ overvoltage.

The storage battery half-cell according to the invention comprises, in particular, an electrode which is manufactured from an electrically conducting ceramic material which is coated, at least at its surface which comes into contact with the suspension of particles of active material used, with ceramic material, while the suspension contains zinc particles in an alkaline electrolyte.

In particular, in the case of a storage battery half-cell in which an alkaline zinc suspension is able to circulate, the use of ceramic material at the surface of the electrode material or current collector material to be used is of considerable advantage. A zinc precipitate formed during the charging-up of such a zinc suspension half-cell adheres very little to the surface of the current collector and can easily be resuspended.

The invention also relates to a storage battery comprising one or more storage battery cells in which each storage battery cell is composed of two half-cells which are separated by a separator and in which at least one of the half-cells of each storage battery cell contains a circulating electrolyte in the form of a suspension of particles of active material, while both half-cells are provided with the necessary electrodes and electrode attachment means, characterized in that in a storage battery of this type at least one of the half-cells is a half-cell according to the present invention.

BRIEF DESCRIPTION OF THE DRAWINGS

The invention will now be explained with reference to the accompanying drawings, in which.

DESCRIPTION OF A PREFERRED EMBODIMENT

Figure 1:
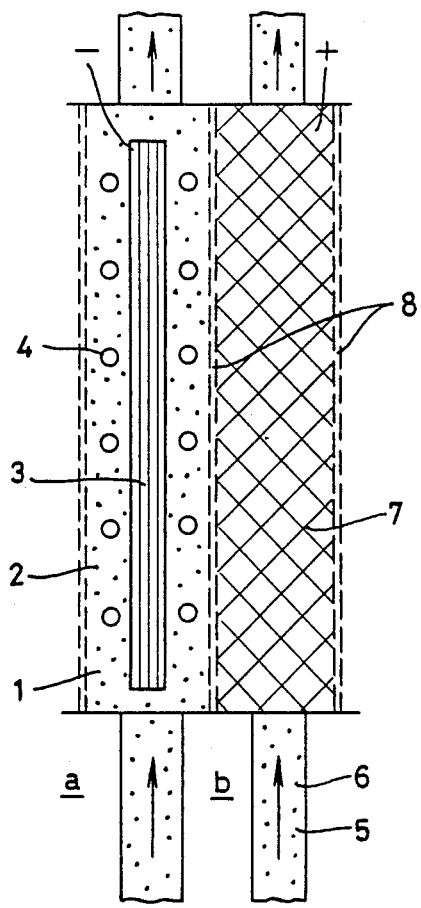
FIG. 1 represents a section of a storage battery cell in which at least one electrode is accommodated which is manufactured from the electrode material or current collector material according to the invention.

In FIG. 1, storage battery half-cell a is a cell in which an alkaline zinc suspension 1 containing zinc particles 2 circulates. The current collector is indicated by 3, while 4 indicates turbulence-generating means. The zinc half-cell is separated from the other half-cell be a separator 8; at the outside of the storage battery cell, there are also separators 8 present, indicating that the storage battery cell shown here forms part of a storage battery constructed of several cells. Obviously, the separators 8 which form the outer boundary of the storage battery cell may also be of leak-proof construction so that the storage battery cell is able to operate per se. Indicated in the Figure is the fact that the two half-cells are incorporated in an external electrolyte circulation system.

Half-cell b is in that case advantageously a half-cell in which an electrolyte also circulates which is advantageously an alkaline electrolyte which contains $MnO_2$ particles. For a description of a half-cell containing such an alkaline $MnO_2$ suspension as electrolyte, reference is made to the Dutch patent application 8800499 of the Applicant which was filed simultaneously with the corresponding Dutch application No. 8800500 on which the present application relies for priority filed.

An $MnO_2$ suspension optionally used with advantage in half-cell b is indicated by 5, while the $MnO_2$ particles are indicated by 6. An electrode used is indicated by 7. Obviously, instead of a half-cell containing an $MnO_2$ suspension, a half-cell of another type can also be used, such as, for example, an air half-cell, such as described in the above-mentioned Dutch Application 7800921.

Figure 2:
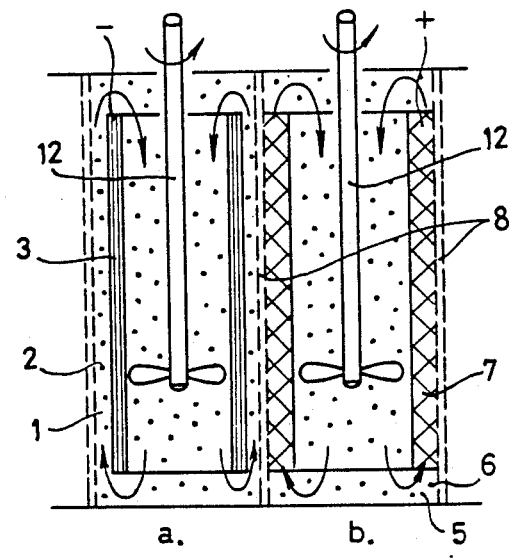
FIG. 2 represents a storage battery cell which differs from the cell in FIG. 1 by the presence of an internal circulation system.
Figure 3:
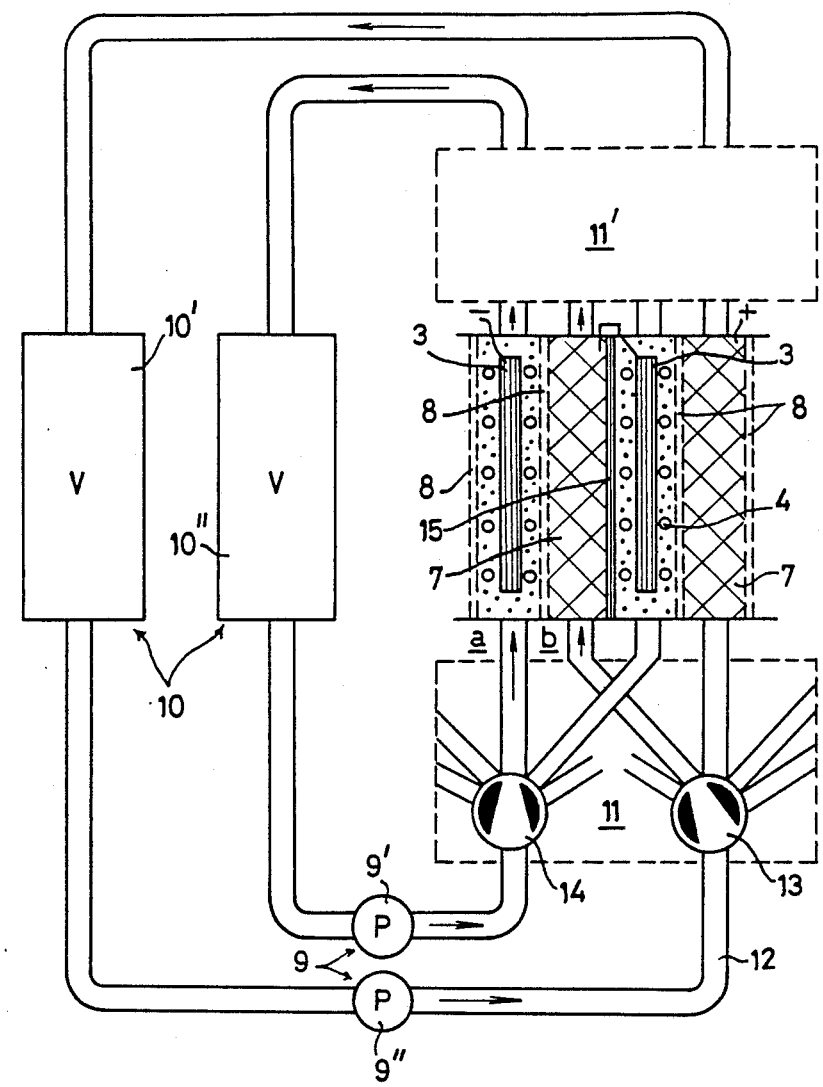
FIG. 3 represents a series circuit of storage battery cells according to FIG. 1.

FIG. 2 also indicates a storage battery cell constructed of two half-cells, in this case, however, the two electrodes 3 and 7 being constructed as cylindrical electrodes in which an electrolyte circulation stirrer is fitted. The stirrer is such that, in half-cell a (a zinc half-cell), the zinc suspension propelled downwards is returned on the outside of electrode 3. Electrode 3 is in that case very advantageously an electrically conducting ceramic material or a metal which is coated at its surface with a conducting ceramic compound such as metal nitrides, metal carbides, metal borides, metal silicides, metal beryllides, metal selenides, metal phosphides or metal chromides and combinations thereof such as beryl borides and other materials mentioned above. Electrode 7, for example in a half-cell used containing a $MnO_2$ suspension, is a porous electrode through which the $MnO_2$ suspension, flowing back, flows. Advantageously, such a porous electrode may also be composed of a conducting material which is coated with a conducting ceramic material, for example TiN. Porous glassy carbon (RVC) or another porous carbon such as C felt can also be used for this purpose. Such a porous electrode through which flow can pass may, however, also be used in half-cell a which is, for example, a zinc suspension half-cell. FIG. 3 indicates a series circuit of storage battery cells according to FIG. 1 in which, to avoid leakage currents through the electrolyte in the presence of an external electrolyte circulation system, a flow distributor 11 and 11' is present for each type of half-cell. The purpose of said flow distributor 11 and 11' is to ensure that it is always only one storage battery cell (and therefore two storage battery half-cells) through which the electrolyte flows. That is to say, at a particular instant flow takes place in total only through two half-cells, for example a zinc half-cell and a $MnO_2$ half cell. At that instant there is no flow through the other cells. The flow takes place only for a short time, for example 10 seconds.

The two electrolyte circuits are maintained by pumps 9' and 9'', while suspension buffer vessels are furthermore present in the circuits in the form of vessels 10' and 10''. In this Figure, there are also porous separator walls between the half-cells and at the outside of the storage battery, indicating that the storage battery is conceived as constructed of several storage battery cells. The separating wall 15 between the two storage battery cells is a leak-proof wall. If it is desired to operate only an assembly of two half-cells, the separators 8 which form the outermost boundary can be replaced by closed walls, or one closed wall if the storage battery is cylindrical. Such separators are such that only ion transfer can take place through them and they are composed in general of an ion-exchange membrane or a microporous polymer structure which prevents the passage of the suspensions used. The electrolyte is composed of a 2–12 N KOH solution to which additives known from the literature have been added, such as 28 g/dm$^3$ SiO$_2$ in the form of silicates, which considerably increases the discharging capacity of the zinc half-cell. Any additives which may also be present in the suspensions, such as non-conducting particles in the form of, for example, polymer particles, conducting particles should exhibit equally little adhesion to the electrochemically growing zinc (during charging-up of the cell) in the zinc half-cell. For this reason, in addition to graphite particles, particles of the abovementioned electrically conducting ceramic materials can also very well be used. Adding 10–40% by volume of these particles produces a stable paste in which precipitation of the electrochemically active particles (Zn or $MnO_2$) no longer occurs. As a result of this method, the electrochemically active particles can have virtually any desired size, for example 0.1–500 $\mu$m, preferably 0.5–10 $\mu$m. A second possibility is to use electrochemically active particles (Zn, $MnO_2$) of sufficiently small size ($<1$ $\mu$m) and to prevent coagulation of the particles by adding small quantities of polymer solutions such as polyethylene oxide, polyvinyl alcohol or polyvinyl acetate. This produces a stable suspension. In the event that a storage battery is required for delivering large currents, the storage battery cells in FIG. 3 can be connected in parallel; the separating wall 15 can then be replaced by a porous separator wall 8. The flow of electrolytes can then take place in all the cells belonging to the same circuit at the same time, so that flow distributors can be omitted.

What is claimed is:

1. Storage battery half-cell in which a suspension of particles of an electrolyte material is able to circulate, at least comprising a casing, an electrolyte material circulation means, an electrode (current collector) and electrode attachment means, in which the electrode is formed from a material which is coated, at least at its surface which comes into contact with a suspension to be used, with an electrically conducting ceramic material.

2. Storage battery half-cell according to claim 1, in which the electrically conducting ceramic material is chosen from vanadium nitride, titanium nitride, titanium boride and titanium silicide.

3. Storage battery half-cell according to claim 2, in which the storage battery half-cell comprises an electrode which is manufactured from an electrode material which is coated, at least at its surface which comes into contact with a suspension of particles of active electrolyte material used, with titanium nitride, while the suspension contains zinc particles in an alkaline electrolyte.

4. Storage battery comprising one or more storage battery cells in which each storage battery cell is composed of two half-cells which are separated by a separator and at least one of the half-cells of each storage battery cell contains a circulating electrolyte in the form of a suspension of particles of active material, while both half-cells are provided with the necessary electrodes and electrode attachment means, in which at least one of the half-cells of the storage battery cell is a half-cell according to claim 1.

* * * * *